United States Patent [19]
Shino

[11] Patent Number: 5,350,551
[45] Date of Patent: Sep. 27, 1994

[54] METHOD OF FIRING CERAMIC MOLDINGS CONTAINING A DIFFUSIBLE METALLIC OXIDE

[75] Inventor: Kenji Shino, Sakado, Japan

[73] Assignee: Sanken Electric Co., Ltd., Saitama, Japan

[21] Appl. No.: 773,404

[22] Filed: Oct. 9, 1991

[30] Foreign Application Priority Data

Oct. 15, 1990 [JP] Japan .................. 2-275669
Oct. 17, 1990 [JP] Japan .................. 2-278209

[51] Int. Cl.$^5$ .................. C04B 35/64; F27D 5/00; F27B 9/14
[52] U.S. Cl. .................. 264/57; 264/58; 432/258; 432/259
[58] Field of Search .................. 264/57, 58; 432/258, 432/259

[56] References Cited

U.S. PATENT DOCUMENTS

| | | | |
|---|---|---|---|
| 2,867,888 | 1/1959 | Schaefer | 264/57 |
| 4,564,489 | 1/1986 | Welzen | 264/57 |
| 4,715,812 | 12/1987 | Matuschka | 264/57 |

Primary Examiner—James Derrington
Attorney, Agent, or Firm—Woodcock Washburn Kurtz Mackiewicz & Norris

[57] ABSTRACT

A ceramic firing method particularly suitable for the fabrication of metallic oxide varistor bodies containing a major proportion of zinc oxide and a minor proportion of antimony oxide. Should moldings of this composition be fired in direct contact with a conventional molding stand, antimony oxide would diffuse readily into the stand, with the consequent creation of varistor bodies that are unsatisfactory in their surge withstanding capability. Therefore, in order to avoid such effluence of antimony oxide or like diffusible metallic oxide, the moldings are fired on a diffusion retarder which preferably is of substantially the same composition as the moldings, only with a higher proportion of the diffusible substance. The diffusion retarder may take the form of either flat overlays or loose particles of sintered ceramic material, both placed on the conventional molding stand.

11 Claims, 4 Drawing Sheets

METHOD OF FIRING CERAMIC MOLDINGS CONTAINING A DIFFUSIBLE METALLIC OXIDE

BACKGROUND OF THE INVENTION

My invention relates to a method of firing ceramic bodies containing a diffusible metallic oxide such for example as antimony trioxide, $Sb_2O_3$. The method of my invention is of particular utility in fabricating electrically resistive ceramic bodies containing a major proportion of zinc oxide, ZnO, and a minor proportion of $Sb_2O_3$, among other metallic oxides, and well suited for use as varistors of improved antisurge capability, although I do not wish my invention to be limited to this particular application.

The varistor is a two electrode semiconductor device, sometimes referred to as a voltage depending resistor because of its voltage dependent nonlinear resistance. An essential property of any ceramic material for use as varistors is, therefore, a nonlinear volt ampere characteristic. A ceramic composition containing a major proportion of zinc oxide and minor proportions of other metallic oxides represents one of the most familiar varistor materials meeting this requirement, being capable of withstanding very high voltage surges.

According to the usual conventional practice for the fabrication of varistors, required proportions of the ingredients in finely divided form were first intimately intermingled. Then, after being admixed with an organic binder, tim mixture of the ingredients was molded into disks. A number of such disklike moldings were then fired simultaneously by making them stand edgewise in a row on a horizontally elongate stand defining a furrow of V shaped cross section. Typically, the molding stand was of either aluminum oxide (alumina), $Al_2O_3$, or magnesium oxide (magnesia), MgO.

I have found that this conventional practice is strongly objectionable in cases where the moldings contain a diffusible substance, particularly a low melting point metallic oxide such as $Sb_2O_3$. Such a metallic oxide has proved to diffuse readily into the molding stand when the moldings are fired at a temperature above its melting point. Consequently, no matter how intimately the ingredients were intermingled, the diffusible metallic oxide became markedly absent from the neighborhoods of those edge portions of the completed ceramic bodies which had been in contact with the stand.

Such absence of some ingredient from parts of the ceramic bodies can make them totally defective, not usable for their intended applications. Take for example the noted ZnO ceramic composition containing $Sb_2O_3$ as a diffusible metallic oxide. $Sb_2O_3$ in this composition is intended to serve the purpose of preventing the crystal grains of zinc oxide from growing too large in size upon firing of the moldings. Actually, I have confirmed that the ZnO crystal grains grew inordinately large at those portions of the completed ceramic bodies where the content of $Sb_2O_3$ was much less than at the other portions. The antisurge capabilities of the varistors having regions of such large crystal grains were much less than those of varistors of the same composition having no such localized regions of reduced $Sb_2O_3$ concentration.

SUMMARY OF THE INVENTION

I have hereby discovered how to avoid the effluence of some diffusible substance or substances from ceramic moldings being fired, and hence to provide sintered ceramic bodies of unfluctuating compositions and uniform physical properties throughout.

Briefly, my invention may be summarized as a method of making a sintered ceramic body, which comprises preparing a ceramic molding containing a diffusible metallic oxide. There is also prepared a diffusion retarder of sintered ceramic material containing the diffusible metallic oxide. The ceramic molding is fired and sintered to maturity on this diffusion retarder.

Preferably, the diffusion retarder is of substantially the same composition as the ceramic molding to be fired, only with a higher proportion of the diffusible metallic oxide. The diffusion retarder of this composition can most effectively prevent the effluence of the diffusible metallic oxide from the ceramic molding by diffusion.

For the quantity production of varistor bodies by the method of my invention, a set of disklike moldings of desired ceramic composition containing a diffusible metallic oxide such as $Sb_2O_3$ may be fired by being placed side by side and edgewise on the conventional molding stand via the diffusion retarder. As the molding stand has an upwardly open furrow of V shaped cross section, the diffusion retarder may take the form of a pair of flat plates or overlays placed one upon each of the two molding stand surfaces defining the furrow. Each overlay may be a sintering of substantially the same composition as the moldings. Another preferred form of the diffusion retarder is an aggregate of loose particles formed by pulverizing a sintering of substantially the same composition as the moldings. Such loose particles may be charged into the furrow in the molding stand.

Either way, the moldings being fired can be held totally out of contact with the molding stand, so that $Sb_2O_3$ or like diffusible metallic oxide is not to diffuse into the molding stand. Experiment has proved that the varistor bodies fired on such diffusion retarders according to my invention are far better in antisurge capability than those fired in direct contact with the conventional molding stand.

The above and other features and advantages of my invention and the manner of realizing them will become more apparent, and the invention itself will best be understood, from a study of the following description and appended claims, with reference had to the attached drawings showing some preferred modes of carrying out the method of my invention.

DETAILED DESCRIPTION

The method of my invention features the use of a diffusion retarder in firing ceramic moldings for production of sintered bodies. The method may be applied to the production of any sintered ceramic bodies containing a diffusible ingredient or ingredients. However, as I have ascertained by experiment, the use of the diffusion retarder according to my invention is of particular utility in firing ceramic moldings consisting essentially of: (a) 100 parts by weight of a mixture of 80.0–97.5 mole percent ZnO, 0.3–3.0 mole percent bismuth trioxide, $Bi_2O_3$, 0.3–3.0 mole percent $Sb_2O_3$, 0.3–3.0 mole percent cobaltous oxide, CoO, 1.0–5.0 mole percent magnesium oxide, MgO, 0.3–3.0 mole percent manganous oxide, MnO, and 0.3–3.0 mole percent nickel oxide, NiO; (b) 0.01–0.10 part by weight boric oxide, $B_2O_3$; and (c) 0.0028–0.0112 part by weight magnesium aluminum tetraoxide, $MgAl_2O_4$ or 0.020 to 0.008 part by weight $Al_2O_3$. However, any one or more of $Bi_2O_3$, CoO, MgO, MnO, NiO, $B_2O_3$, $MgAl_2O_4$ and $Al_2O_3$ may be omitted.

Of the listed ingredients of preferred ceramic materials to be fired by the method of my invention, $Sb_2O_3$ performs the important function of preventing ZnO crystal grains from growing too large in size upon firing of the moldings of the above composition. However, as mentioned above in connection with tim prior art, this metallic oxide, with a melting point of approximately 656° C., will diffuse readily into the molding stand of known compositions if the moldings are fired in direct contact therewith at temperatures above the melting point according to the prior art.

I have found that the effluence of $Sb_2O_3$ from the ceramic moldings by diffusion can be prevented, or reduced to an absolute minimum, if they are fired on the diffusion retarder which preferably is a sintering of substantially the same composition as the moldings to be fired. Further, for most effectively preventing the effluence of $Sb_2O_3$, I suggest that the proportion of this metallic oxide in the diffusion retarder be made higher than that in the ceramic moldings. Thus, for the best results, the diffusion retarder may contain 0.5–5.0 mole percent $Sb_2O_3$ for firing the ceramic moldings of the above compositions containing 0.3–3.0 mole percent $Sb_2O_3$.

EXAMPLE I

I will now describe the method of my invention in detail as applied by way of example to the fabrication of metallic oxide ceramic bodies for use as varistors. I first prepared the following ingredients in finely divided form and in the following relative proportions:

| | |
|---|---|
| ZnO | 93.2 mole percent |
| $Bi_2O_3$ | 0.3 mole percent |
| $Sb_2O_3$ | 1.5 mole percent |
| CoO | 1.0 mole parcent |
| MgO | 2.5 mole percent |
| MnO | 0.5 mole percent |
| NiO | 1.0 mole percent |

To 100 parts by weight of these major ingredients I added 0.05 part by weight of $B_2O_3$ and 0.003 part by weight of $Al_2O_3$.

Figure 1:
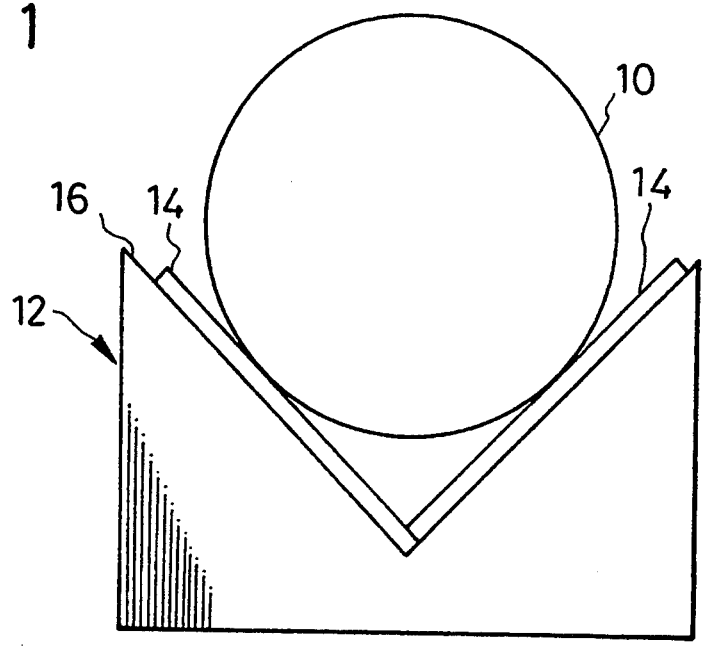
FIG. 1 is an end elevation showing a set of disklike ceramic moldings being fired on a pair of diffusion retarder overlays on a molding stand by the method of my invention.
Figure 2:
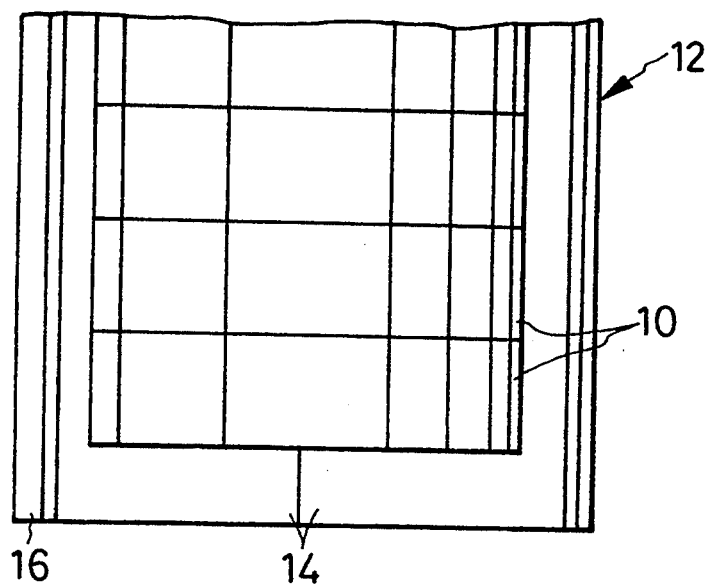
FIG. 2 is a partial top plan of the showing of FIG. 1.

Then I ball milled the above mixture of the ingredients and granulated it. Then I molded the granular material into disks under pressure. FIGS. 1 and 2 show the disklike moldings 10. Each molding 10 was 10 millimeters in diameter and three millimeters in thickness.

Figure 3:
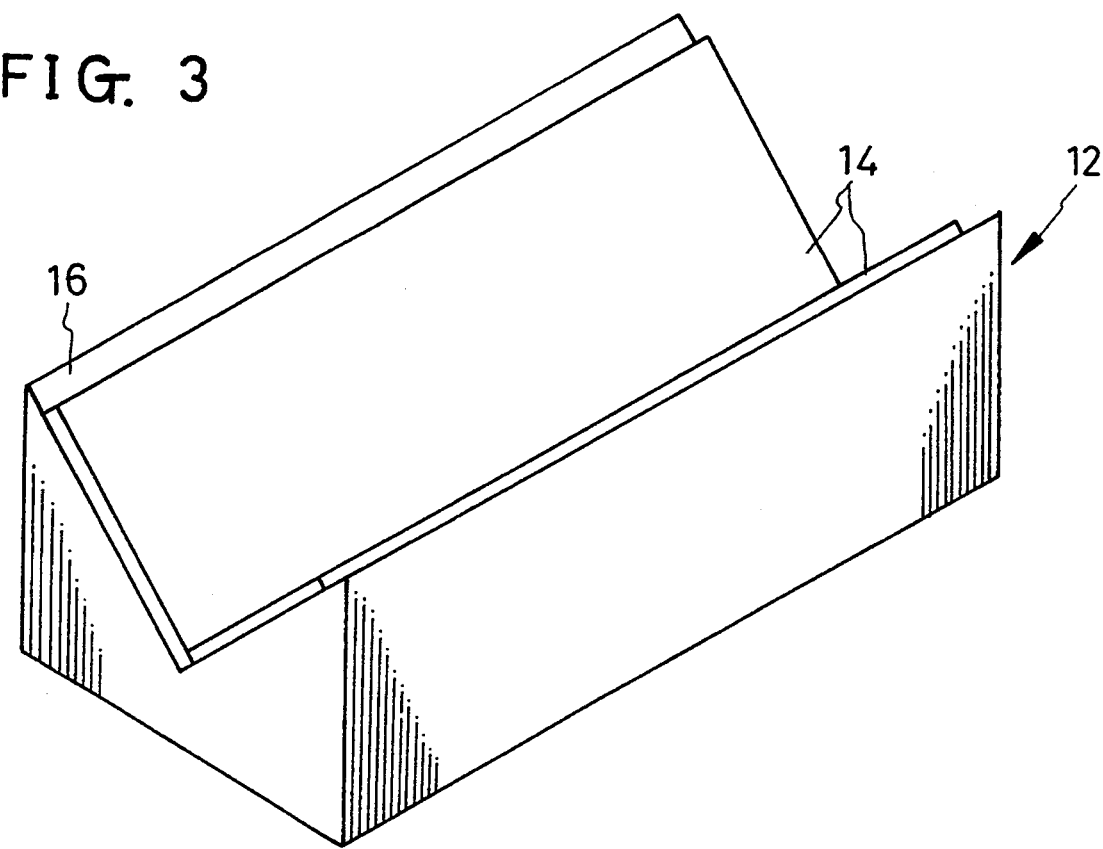
FIG. 3 is a perspective view of the molding stand of FIGS. 1 and 2 shown together with the diffusion retarder overlays thereon.

Then, for firing the disklike moldings 10, I prepared a molding stand, shown at 12 in FIGS. 1–3, together with a diffusion retarder to be placed thereon in accordance with a feature of my invention. Itself of conventional make, the molding stand 12 was elongated horizontally, defining a furrow 16 of V shaped cross section directed upwardly. This stand was a sintering composed principally of magnesium oxide.

In this particular example of my method I employed two flat overlays 14 of rectangular shape as the noted diffusion retarder. I fabricated the overlays 14 from the same metallic oxides as those listed above for the production of varistors. Although the relative proportions of the metallic oxides constituting the overlay material were approximately the same as above, I set the proportion of $Sb_2O_3$ at 2.0 mole percent, compared with 1.5 mole percent in the above composition for varistor production, because the overlays 14 were intended primarily to prevent the dills fusion of that metallic oxide from the moldings 10 into the molding stand 12. I molded the mixture of the metallic oxides into the form of rectangular plates and fired and sintered them to maturity. The thus prepared overlays 14 were placed one upon each of the two flat top surfaces of the molding stand 12 defining the furrow 16.

Then I placed a set of above prepared disklike moldings 10 side by side and edgewise on the overlays 14 on the molding stand 12, as illustrated in FIGS. 1 and 2. It will be seen that each molding 10 contacts the overlays 14 only at two peripheral points or parts and is totally out of contact with tile molding stand 12.

Then I introduced the set of moldings 10 into a heating furnace together with the molding stand 12 and the overlays 14. Then I fired the moldings in air, first heating them to 500° C. at a rate of approximately 100° C. per hour, then to a peak temperature of 1250° C. at a rate of approximately 250° C. per hour, and maintaining the peak temperature for one hour. Then I allowed the fired moldings to cool to room temperature, thereby completing sintered varistor bodies, shown in FIG. 4 and therein designated 10', of substantially the same composition as that before firing.

Figure 4:
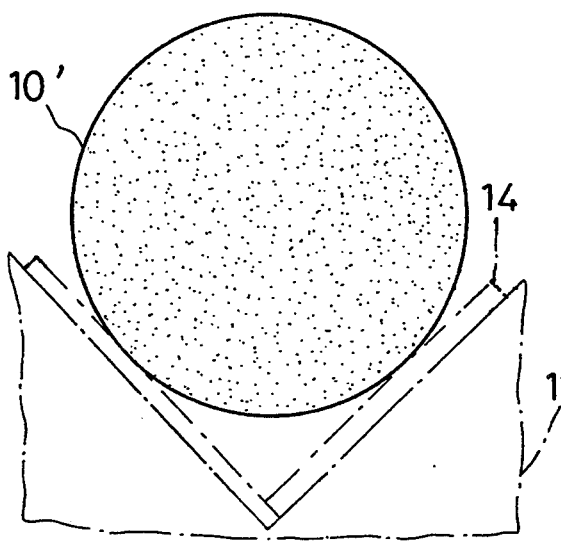
FIG. 4 is a view somewhat similar to FIG. 1 but showing the distribution of $Sb_2O_3$ in each ceramic body that has been sintered on the diffusion retarder overlays by the method of my invention.

The fine dots shown in FIG. 4 indicate the concentration distribution of $Sb_2O_3$ in each completed varistor body 10'. This $Sb_2O_3$ concentration distribution according to my invention is in contrast to that in varistor bodies 10'', FIG. 5, that were fabricated by the same method as the varistor bodies 10' except that they were fired in direct contact with the molding stand 12 according to the conventional practice. The $Sb_2O_3$ concentration in the conventionally fired varistor bodies 10" was extremely low in the neighborhoods of their edge portions which had been in direct contact with the molding stand 12. I will later refer back to FIGS. 4 and 5.

Figure 6:
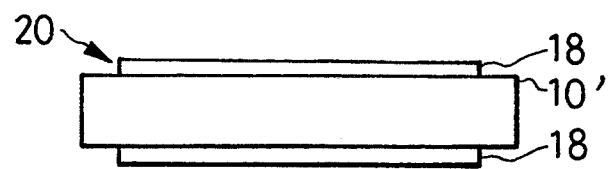
FIG. 6 is a side elevation of each sintered ceramic body of FIG. 4 shown together with a pair of electrodes formed thereon for use as a varistor.

Following the above firing operation I proceeded to the production of a pair of electrodes 18, FIG. 6, on each sintered varistor body 10' formulated as above. To this end I first coated silver paste on the opposite faces of each varistor body 10' and baked the coatings. Thus I completed the fabrication of metallic oxide varistors 20 each constructed as shown in FIG. 6.

Then I tested the antisurge capabilities of ten metallic oxide varistors 20 of the FIG. 6 construction. I first measured the voltage $V_1$ between the pair of electrodes 18 of each varistor 20 at a current of one milliampere. Then I applied five current surges to each varistor at intervals of 30 seconds. Each current surge had a rise time of eight microseconds, a fall time of 20 microseconds, and a peak amplitude of 2500 amperes. Then I again measured the voltage $V_2$ at a current of one milliampere. Then I calculated the percent variation d of the varistor voltages $V_1$ and $V_2$ before and after the surge application by the following equation:

$$d=[(V_1-V_2)/V_1]\times 100.$$

The antisurge capability of each varistor 20 was determined in terms of the number of times the foregoing procedure was repeated until the voltage variation d became 10 percent or more. The greater the number, the better is the varistor in antisurge capability. The above procedure had to be repeated 40 times on the average until the voltage variation d of the ten varistors 20 fabricated according to my invention became 10 percent or more; that is, the noted current surge had to be applied as many as 200 (5×40) times.

Figure 5:
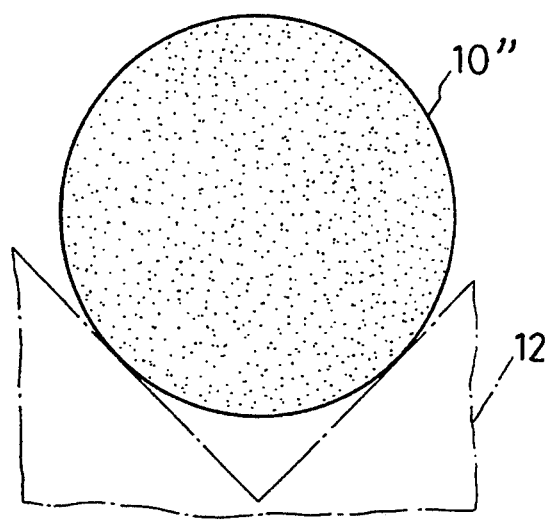
FIG. 5 is a view similar to FIG. 4 but showing the distribution of $Sb_2O_3$ in a ceramic body of the same composition as that of FIG. 4 but which has been sintered in direct contact with the conventional molding stand.

By way of comparison I tested the antisurge capabilities of ten prior art varistors having the sintered metallic oxide bodies 10" of FIG. 5. The voltage variation d of these prior art varistors became 10 percent or more on the average when the above procedure was repeated seven times, that is, when 35 current surges were applied. It is therefore apparent that the varistors made by the method of my invention are far better in antisurge capability than those made by the conventional practice.

A microscopic examination of the varistor bodies 10' according to my invention revealed a uniform distribution of fine crystal grains throughout. Contrastingly, in the prior art varistor bodies 10", the crystal grains were generally larger and unequal in size at their regions of low $Sb_2O_3$ concentration.

I also examined the $Sb_2O_3$ concentration distribution of the varistor bodies 10' according to my invention. As indicated by the dots in FIG. 4, $Sb_2O_3$ was distributed far more uniformly than in the prior art varistor bodies 10" of FIG. 5. I believe it justified to attribute this uniform $Sb_2O_3$ distribution to the overlays 14 I used in firing the moldings 10 on the stand 12. As mentioned earlier, the overlays 14 were of approximately the same composition as the moldings 10 or the sintered varistor bodies 10' except for the higher proportion of $Sb_2O_3$. Obviously, the overlays 14 serves to prevent, or at least drastically reduce, the effluence of $Sb_2O_3$ from the moldings 10 by diffusion while they are being fired, resulting in the provision of varistors having crystal grains of uniform size and hence improved antisurge capabilities.

EXAMPLE II

Figure 7:
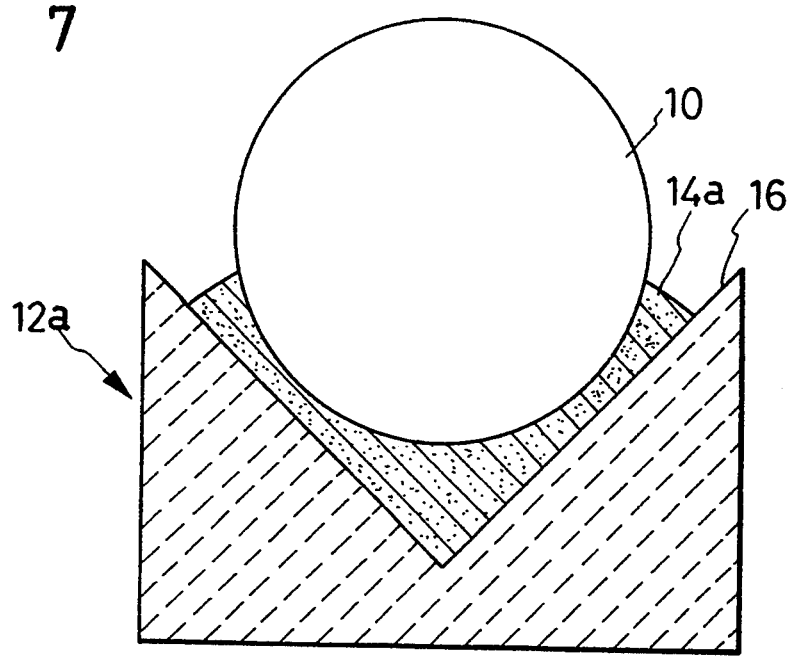
FIG. 7 is a vertical sectional view showing a set of disklike ceramic moldings being fired on another preferred form of diffusion retarder on a molding stand by the method of my invention, the diffusion retarder being here shown as loose particles of sintered ceramic material.
Figure 8:
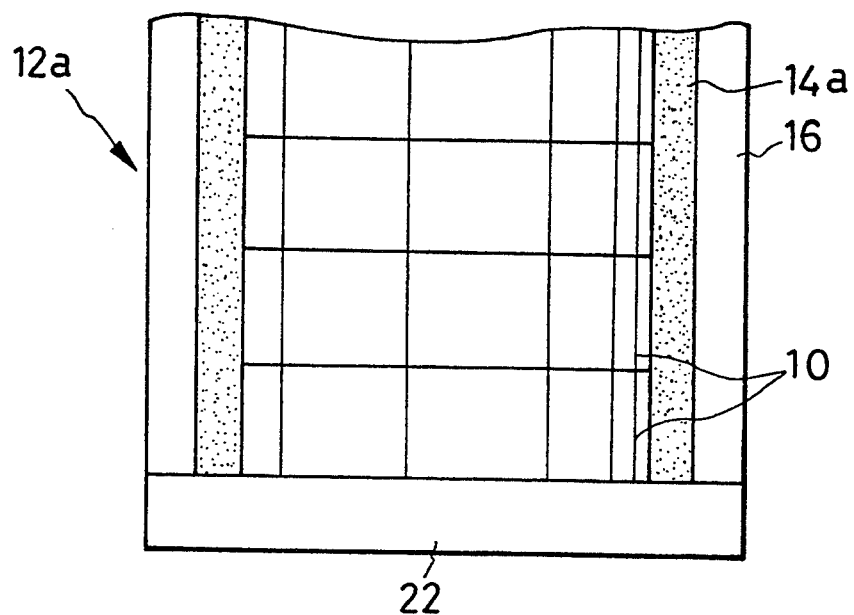
FIG. 8 is a partial top plan of the showing of FIG. 7.

As illustrated in FIGS. 7 and 8, the diffusion retarder used in this alternate example of my method was an aggregate of loose particles 14a of sintered ceramic material. More specifically, I prepared the particulate diffusion retarder 14a by crushing unused platelike overlays 14 of FIGS. 1-3 into particles ranging in size from 100 to 500 micrometers in size. Thus the particulate diffusion retarder 14a was of exactly the same composition as the overlays 14, containing approximately 2.0 mole percent $Sb_2O_3$.

Experiment has proved that, generally, the diffusion retarder particles 14a should be in the range of 50 to 1000 micrometers in size. The particles smaller than the lower limit stuck to the surfaces of the moldings fired thereon. The particles larger than the upper limit roughened the molding surfaces. I particularly recommend the particle sizes of 100 to 500 micrometers employed in this example.

Figure 9:
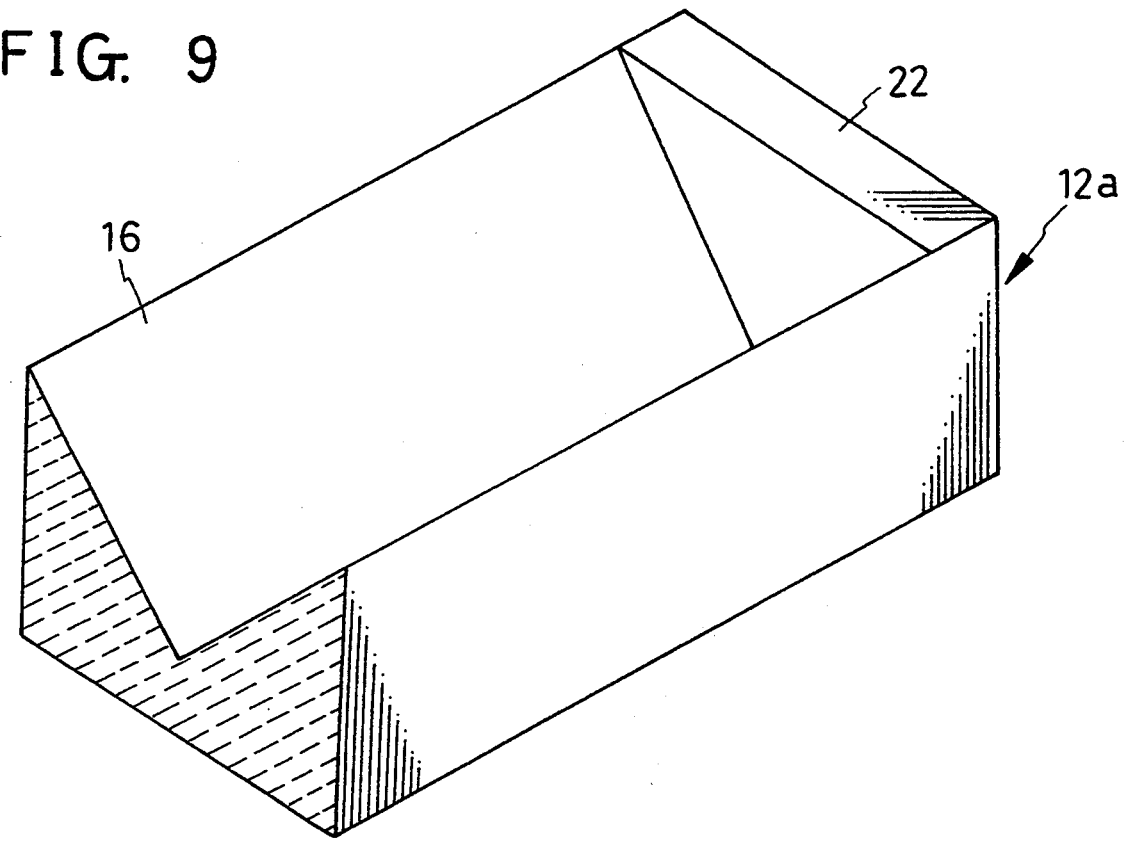
FIG. 9 a partial perspective view of the molding stand of FIGS. 7 and 8.

For use with the loose particle diffusion retarder 14a I modified the conventional molding stand, used in Example I, into the shape best pictured in FIG. 9. Generally designated 12a, the modified molding stand had a pair of end walls 22 closing the opposite ends of the V shaped furrow 16. The diffusion retarder particles 14a were introduced into the furrow 16, in an amount required for covering substantially the complete top surfaces of the stand 12a, and confined therein by the pair of end walls 22. The molding stand 12a, complete with the pair of end walls 22, was of magnesium oxide.

Preparing a set of disklike moldings 10 from the same ingredients, and through the same procedure, as in Example I of my method, I placed them side by side and edgewise on the diffusion retarder particles 14a on the molding stand 12a. As depicted in FIG. 7, the disklike moldings 10 were partly buried in the aggregate of particles 14a but were totally out of contact with the molding stand 12a.

Then I introduced the set of moldings 10 into a heating furnace together with the molding stand 12a and the particulate diffusion retarder 14a. Then I fired the moldings in air, first heating them to 500° C. at a rate of approximately 100° C. per hour, then to a peak temperature of 1250° C. at a rate of approximately 250° C. per hour, and holding them at the peak temperature for one hour. Then I allowed the fired moldings to cool to room temperature, thereby completing sintered varistor bodies of substantially the same composition as that before firing.

Following the above firing operation I proceeded to the production of a pair of electrodes on each sintered varistor body formulated as above. The electrodes were formed by the same method as set forth above with reference to FIG. 6. Thus the metallic oxide varistors fabricated in this alternate example of my method were of the same mechanical construction as those formulated in the preceding example, the only difference being that the former were fired by being placed upon the particulate diffusion retarder 14a.

Then I tested the antisurge capabilities of ten metallic oxide varistors produced in this alternate example, through the same procedure as set forth above in connection with the first described example. The above described procedure of surge application had to be repeated 40 times on the average until the voltage variation d of the ten varistors of this alternate method became 10 percent or more. Thus the antisurge capabilities of the metallic oxide varistors fabricated in accordance with my invention were equally favorable regardless of whether they had been fired on the diffusion retarder overlays 14 or on the diffusion retarder particles 14a.

A microscopic examination of the varistor bodies fabricated by this alternate method also revealed a uniform distribution of fine crystal grains throughout. The $Sb_2O_3$ concentration distribution of the varistor bodies was just as uniform as that of the varistor bodies of the preceding example.

Possible Modifications

Although I have shown and described my invention in very specific aspects thereof, I do not wish my invention to be limited by the exact details of such disclosure. The following, then, is a brief list of possible departures from the foregoing disclosure which we believe all fall within the scope of my invention:

1. The diffusion retarder could take various forms other than the flat overlays 14 and the loose particles
2. The moldings could be placed directly on the molding stand 12, or on any equivalents thereof, by fabricating the molding stand or its equivalents from the diffusion retarder materials according to my invention.
3. The moldings could be stacked up on a diffusion retarder such as that in the form of loose particles, with additional diffusion retarder particles or the like placed as required between the moldings in order to prevent them from sticking to one another as a result of firing.
4. My invention could be adopted for the prevention of effluence of other low melting point metallic oxides such as $Bi_2O_3$ or $B_2O_3$.
5. The molding stand could be a sintering of other substances such as zirconium if the diffusion retarder according to my invention was to be placed thereon.
6. The moldings of the exemplified as metallic oxide ceramic compositions could be fired at temperatures ranging from 1200° to 1350° C. and for a length of time ranging from 30 to 120 minutes.

What I claim is:

1. A method of making a sintered ceramic body suitable for use as an electronic component, which method comprises:
   (a) preparing a ceramic molding containing a major proportion of zinc oxide and a minor proportion of antimony oxide;
   (b) preparing a diffusion retarder of sintered ceramic material containing antimony oxide;
   (c) placing the ceramic molding on the diffusion retarder; and
   (d) firing the ceramic molding on the diffusion retarder until the ceramic molding is sintered to maturity;
   (e) whereby the effluence of antimony oxide from the ceramic molding by diffusion is prevented even if the molding is fired at a temperature above the melting point of antimony oxide.

2. The method of claim 1 wherein the diffusion retarder also contains a major proportion of zinc oxide.

3. The method of claim 1 wherein the proportion of antimony oxide in the diffusion retarder is higher than the proportion of antimony oxide in the ceramic molding.

4. The method of claim 1 wherein the ceramic molding additionally contains a minor proportion of at least one of bismuth oxide, cobaltous oxide, magnesium oxide, manganous oxide, and nickel oxide, and wherein the diffusion retarder of substantially the same composition as the ceramic molding.

5. A method of making a sintered ceramic body suitable for use as in electronic component, which method comprises:
   (A) preparing a ceramic molding containing:
      (a) 100 parts by weight of a mixture of 80.0–97.5 mole percent zinc oxide, 0.3–3.0 mole percent bismuth oxide, 0.3–30 mole percent antimony oxide, 0.3–3.0 mole percent cobaltous oxide, 1.0–5.0 mole percent magnesium oxide, 0.3–3.0 mole percent manganous oxide, and 0.3–3.0 mole percent nickel oxide;
      (b) 0.01–0.10 part by weight boric oxide; and
      (c) 0.0028–0.0112 part by weight magnesium aluminum tetraoxide;
   (B) preparing a diffusion retarder of sintered ceramic material containing antimony oxide;
   (C) placing the ceramic molding on the diffusion retarder; and
   (D) firing the ceramic molding on the diffusion retarder until the ceramic molding is sintered to maturity;
   (E) whereby the effluence of antimony oxide from the ceramic molding by diffusion is prevented, resulting in the creation of zinc oxide crystal grains of practically uniform size throughout the sintered ceramic molding, even if the molding is fired at a temperature above the melting point of antimony oxide.

6. The method of claim 5 wherein the diffusion retarder is of substantially the same composition as the ceramic molding except that the diffusion retarder contains a higher proportion of antimony oxide.

7. The method of claim 5 wherein the proportion of antimony oxide in the diffusion retarder is 0.5–5.0 mole percent.

8. A method of making sintered ceramic bodies suitable for use as electronic components, which method comprises:
   (a) preparing ceramic moldings of disklike shape containing a major proportion of zinc oxide and a minor proportion of antimony oxide;
   (b) preparing a molding stand defining a furrow of V shaped cross section;
   (c) preparing a diffusion retarder of sintered ceramic material containing antimony oxide;
   (d) placing the diffusion retarder in the furrow of the molding stand;
   (e) placing the ceramic moldings side by side and edgewise in the furrow of the molding stand via the diffusion retarder in order to avoid direct contact of the ceramic moldings with the molding stand; and
   (f) firing the ceramic moldings until the moldings are sintered to maturity;
   (g) whereby the diffusion of antimony oxide from the ceramic moldings into the molding stand is prevented, resulting in the creation of zinc oxide crystal grains of practically uniform size throughout each ceramic molding, even if the ceramic moldings are fired at a temperature higher than the melting point of antimony oxide.

9. The method of claim 8 wherein the diffusion retarder comprises a pair of flat overlays.

10. The method of claim 8 wherein the diffusion retarder is in the form of loose particles formed by crushing a sintering of the ceramic material.

11. The method of claim 8 wherein the diffusion retarder is of substantially the composition as the ceramic moldings except that the diffusion retarder contains a higher proportion of antimony oxide than does each ceramic molding.

* * * * *